US006978209B2

(12) United States Patent
Nakahara et al.

(10) Patent No.: US 6,978,209 B2
(45) Date of Patent: Dec. 20, 2005

(54) MOBILE TERMINAL AND NAVIGATION SYSTEM

(75) Inventors: Fumiharu Nakahara, Hitachinaka (JP); Yoshiaki Umehara, Hitachiota (JP); Naoki Tsuji, Hitachinaka (JP); Osamu Hasegawa, Mito (JP); Junichi Yoshida, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/383,913

(22) Filed: Mar. 7, 2003

(65) Prior Publication Data

US 2004/0048620 A1 Mar. 11, 2004

(30) Foreign Application Priority Data

Sep. 10, 2002 (JP) .............................. 2002-263569

(51) Int. Cl.7 ........................................... G01C 21/30
(52) U.S. Cl. ...................... 701/209; 701/208; 701/211; 340/990; 340/995.12; 340/995.17; 340/995.19; 455/456.4; 455/457; 342/357.17
(58) Field of Search ......................... 455/456.1, 456.5, 455/456.6, 343.2, 342.4, 457, 556.1, 556.2, 455/569.1, 569.2, 572, 574, 575.9, 456.2, 455/456.3, 456.4, 343.1; 345/211–212, 851–855, 345/162; 701/200–201, 207–213; 340/988–993, 340/995.1, 995.12, 995.14, 995.19, 995.21, 340/995.17; 342/357.01, 357.06, 357.08, 342/357.17, 458; 715/848–851, 853–855, 715/864

(56) References Cited

U.S. PATENT DOCUMENTS

| | | | | |
|---|---|---|---|---|
| 4,675,676 A | * | 6/1987 | Takanabe et al. | 340/995.15 |
| 5,243,529 A | * | 9/1993 | Kashiwazaki | 701/208 |
| 5,450,343 A | * | 9/1995 | Yurimoto et al. | 701/208 |
| 5,508,931 A | * | 4/1996 | Snider | 701/207 |
| 5,638,279 A | * | 6/1997 | Kishi et al. | 701/200 |
| 5,801,680 A | * | 9/1998 | Minakuchi | 345/589 |
| 5,884,218 A | * | 3/1999 | Nimura et al. | 701/208 |
| 6,427,115 B1 | * | 7/2002 | Sekiyama | 701/208 |
| 6,633,763 B2 | * | 10/2003 | Yoshioka | 455/457 |
| 6,684,083 B1 | * | 1/2004 | Harimoto | 455/556.1 |
| 6,701,251 B2 | * | 3/2004 | Stefan et al. | 701/211 |
| 6,708,110 B2 | * | 3/2004 | Stefan et al. | 701/209 |
| 6,771,189 B2 | * | 8/2004 | Yokota | 340/990 |
| 2002/0025839 A1 | * | 2/2002 | Usui | 455/574 |
| 2002/0143466 A1 | * | 10/2002 | Mutoh | 701/207 |
| 2003/0028318 A1 | * | 2/2003 | Kaji et al. | 701/209 |
| 2003/0074135 A1 | * | 4/2003 | Watanabe et al. | 701/209 |
| 2003/0129995 A1 | * | 7/2003 | Niwa et al. | 455/456 |
| 2003/0191583 A1 | * | 10/2003 | Uhlmann et al. | 701/208 |
| 2004/0012505 A1 | * | 1/2004 | Yokota | 340/995.1 |

FOREIGN PATENT DOCUMENTS

| | | | | |
|---|---|---|---|---|
| EP | 629841 A1 | * | 12/1994 | G01C 21/20 |
| JP | 09-280878 | | 10/1997 | |
| JP | 2002-081957 | | 3/2002 | |

* cited by examiner

Primary Examiner—Jacques H. Louis-Jacques
(74) Attorney, Agent, or Firm—Townsend and Townsend and Crew LLP (57) ABSTRACT

A navigation system for route guidance is provided. The navigation system comprises a navigation server storing map information and the mobile terminal displaying map information. The mobile terminal has access to the navigation server through a communication network and is controlled to turn on and off the display of map information.

10 Claims, 7 Drawing Sheets

| 1 | PORTABLE TELEPHONE ID |
| --- | --- |
| 2 | DESTINATION INFORMATION |
| 3 | RELAY POINT INFORMATION 1 |
|  | RELAY POINT INFORMATION 2 |
|  | ⋮ |
| 4 | CURRENT POSITION INFORMATION |

MOBILE TERMINAL AND NAVIGATION SYSTEM

BACKGROUND OF THE INVENTION

1. Field of the Invention

The present invention relates to a navigation system employing a mobile terminal to provide route guidance service. The navigation system comprises a navigation server and the mobile terminal has access to the server through communication means such as communication networks including the Internet.

2. Description of the Related Art

As mobile terminals have come into widespread use, various services are provided to meet the diverse needs of users. Many forms of business are announced to provide guidance services for users who have access to navigation servers through their mobile terminals and communication networks including the Internet.

Japanese Patent Laid-open No. 2002-81957 discloses a power-saving navigation system employing a mobile navigation device. According to the above Japanese Patent Laid-open No. 2002-81957, while guiding a user toward a landmark, the navigation system saves electricity by starting calculation to compare the user's position found with GPS satellites and the landmark when it is nearly time for the user to arrive at the landmark.

BRIEF SUMMARY OF THE INVENTION

The power saving of the navigation system of Japanese Patent Laid-open No. 2002-81957 is not perfect because it economizes on power by calculation as described above, whereas a display, a user interface, and a communication interface of the mobile navigation device are live.

The present invention provides a navigation system employing a mobile terminal. The navigation system comprises a navigation server storing map information, and the mobile terminal has access to the navigation server through a communication interface. The mobile terminal is capable of acquiring information about its current position, inputting information about the destination, and displaying map information. Further, the mobile terminal turns on and off the display of map information, depending on the distance from its current position to the destination or the calculated time necessary for its user to reach the destination.

In one preferred aspect, the present invention resides in a mobile terminal which receives pieces of map information necessary for route guidance from a navigation server through a communication interface and displays such map information. The mobile terminal comprises a current-position detector to acquire information about its current position, a destination/relay-point input interface to input information about a destination and relay points, and a controller to turn on and off the display of map information, depending on the distance from its current position to the destination or the calculated time necessary for its user to reach the destination.

Accordingly, the present invention achieves the power saving of the navigation system and the mobile terminal which are convenient to pedestrians.

BRIEF DESCRIPTION OF SEVERAL VIEWS OF THE DRAWINGS

These and other objects, features and advantages of the present invention will become more readily apparent from the following detailed description when taken in conjunction with the accompanying drawing wherein.

DETAILED DESCRIPTION OF THE PREFERRED EMBODIMENTS

Figure 1:
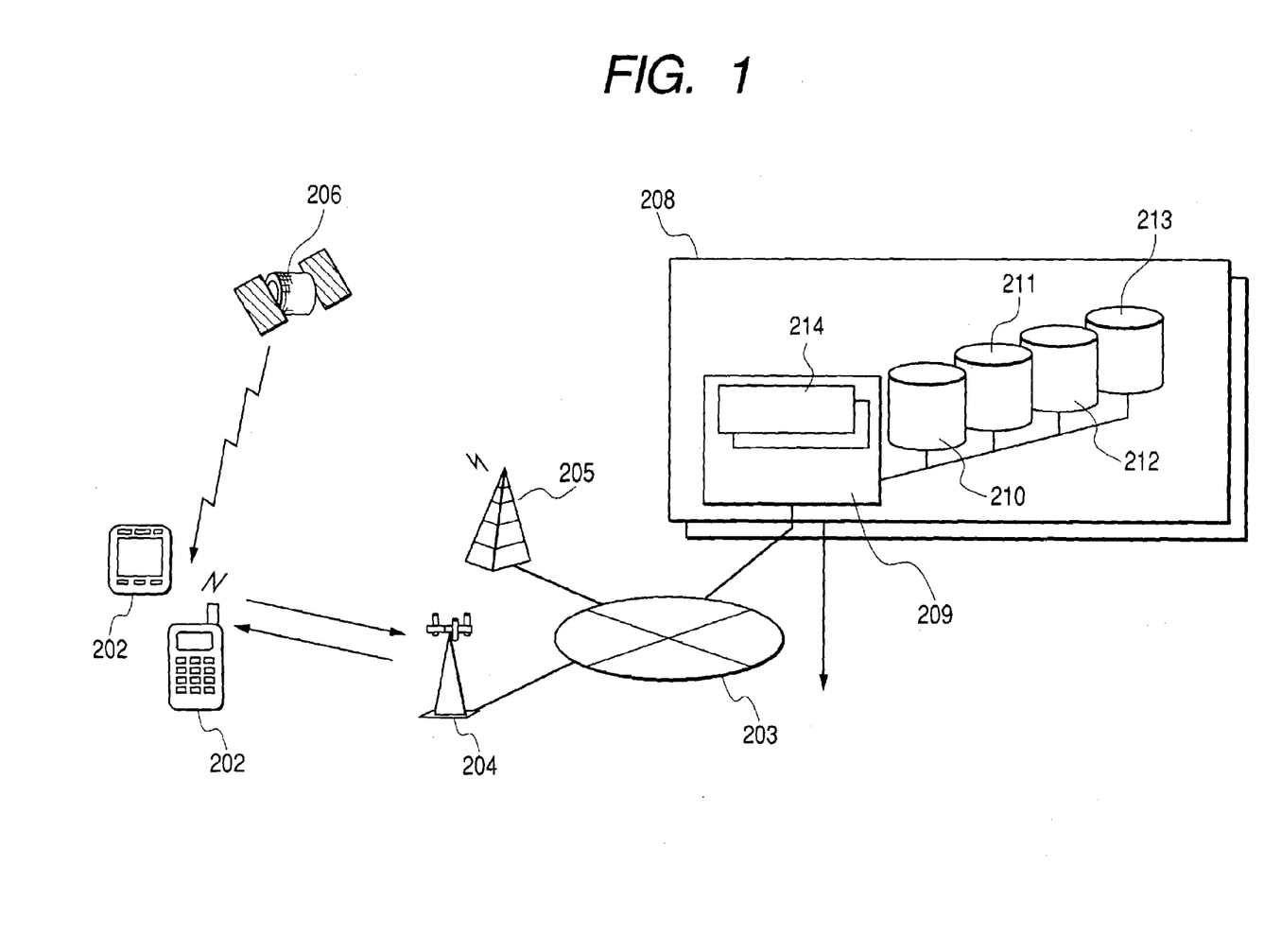
FIG. 1 is a block diagram of a typical navigation system employing a mobile terminal according to the present invention.

FIG. 1 shows the basic configuration of a typical navigation system employing a mobile terminal according to the present invention. According to the present invention, the mobile terminal 202 has a built-in GPS receiver to receive signals from GPS satellites. A navigation server 208 is connected to a radio base station 204 through a communication network 203 (including the Internet). The radio base station 204 communicates with the mobile terminal 202 by means of radio waves. Further, the mobile terminal 202 can receive GPS signals from GPS satellites including one 206. Connected to the communication network 203 is a GPS server 205 which is capable of calculating position information of the current position of the mobile terminal 202. The navigation server 208 comprises a navigation controller 209, a distance calculator 214, a user information table 210, a destination database 211, a map database 212, and a route database 213. The navigation controller 209 acquires various pieces of information from databases in order to control the whole navigation server 208, detects the user of the mobile terminal 202 coming close to a relay point or the destination, and acquires information about the user's current position after the lapse of a certain time. The distance calculator 214 calculates the distance between two points. The user information table 210 stores various pieces of information about the user such as the user's destination and current position. The destination database 211 stores latitude/longitude information corresponding to the destination and the relay points inputted by the user. The map database 212 stores map information. The route database 213 stores information about the shortest route between any two points.

Figure 2:
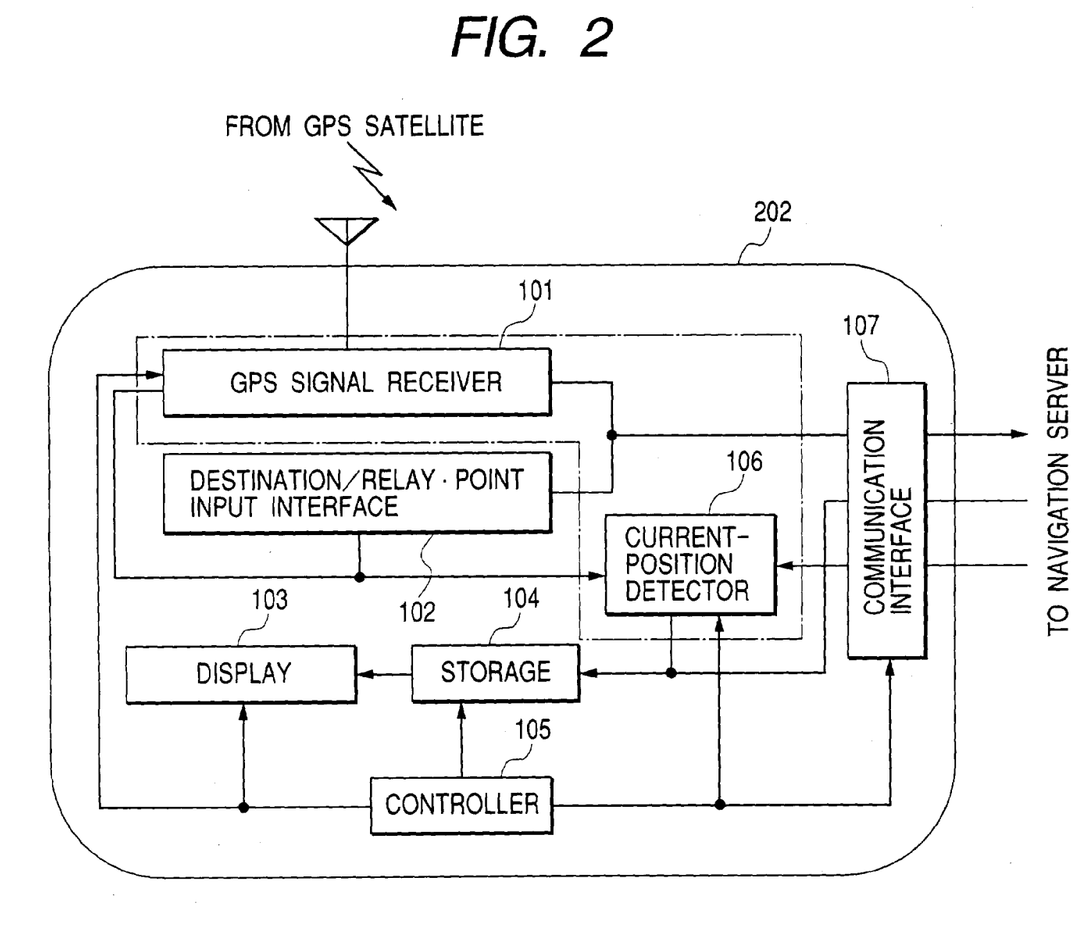
FIG. 2 is a block diagram of the mobile terminal of FIG. 1.

With reference to FIG. 2, the workings of the mobile terminal 202 will now be described. When route guidance starts, the built-in GPS-signal receiver 101 described earlier receives, from GPS satellites including the one 206, GPS signals from which the user's current position (starting point) is calculated. The user inputs pieces of information about his destination and relay points such as latitude and longitude data, using a destination relay-point input interface 102. Thereafter, the GPS signals and the above position information are sent to the navigation server 208 through a communication interface 107. The navigation server 208 calculates the time necessary for the user to walk from the current position to the next relay point or destination, as the case may be, and sends the calculated time to a storage 104 and a controller 105 of the mobile terminal 202. A current-position detector 106 receives information about the current position such as latitude and longitude data from the navigation server 208 through the communication interface 107. The received information about the current position and the inputted information about the destination and the relay points are stored in the storage 104. Thereafter, the controller 105 turns off the communication interface 107 until the calculated necessary time from the current position to the next relay point or destination, as the case may be, passes. After the lapse of the calculated necessary time, the controller 105 turns on the communication interface 107 and controls the GPS-signal receiver 101 and the current-position detector 106 in order to receive GPS signals from GPS satellites including the one 206 and acquire information about the current position from the GPS server 205 and the distance from the current position to the next relay point or destination, as the case may be, from the navigation server 208. The controller 105 controls a display 103 and the storage 104 so as to turn on or off the display of map information, etc. from the navigation server 208 depending on whether or not the acquired distance is smaller than a preset threshold value. The GPS-signal receiver 101, current-position detector 106, storage 104, display 103, and communication interface 107 may be controlled so that map information, other information, and the current position will be displayed in real time when it is judged that the user has come close to the next relay point or destination, as the case may be. Thereafter, the storage 104, display 103, and communication interface 107 may be controlled so that the display of the map information and the communication with the servers 205 and 208 will be turned off when the user reaches and passes the next relay point or arrives at the destination, as the case may be.

Now the outline of workings of the navigation system will be described. For the user of a mobile terminal 202 to receive guidance by the navigation system of the present invention, the user first gains access to the navigation server 208 through the mobile terminal 202, radio base station 204, and communication network 203. Next, the user inputs his or her destination and relay points by using the destination/relay-point input interface 102 of the mobile terminal 202. This step can be effected by inputting the addresses, telephone numbers, or latitude and longitude data of the destination and the relay points.

Figure 3:
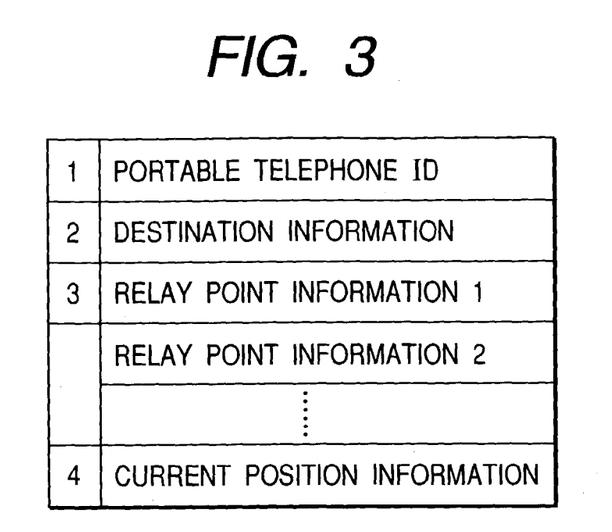
FIG. 3 shows, a typical user information table for the navigation system of FIG. 1.

The information about the destination and relay points inputted in the mobile terminal 202 is transmitted to the navigation server 208 through the radio base station 204 and the communication network 203. The navigation controller 209 of the navigation server 208 prepares a user information table 210 based on the information about the destination and the relay points. FIG. 3 shows the configuration of a typical user information table 210. A user information table 210 is prepared for each user, comprising "portable-telephone ID," "destination information," "relay-point information," and "current-position information," showing the current position of the mobile terminal 202. When the user has access to the navigation server 208, the user's portable-telephone ID is transmitted from the mobile terminal 202 to the navigation server 208. Destination information and relay-point information are the latitude and longitude data retrieved from the destination database 211 based on the information about the destination and the relay points inputted by the user. The user information table 210 can have relay-point information about two or more relay points.

After the portable-telephone ID, destination information, and relay-point information are stored in the user information table 210, the navigation server 208 acquires latitude/longitude information about the current position of the mobile terminal 202 (hereinafter, referred to as "positioning") and stores the current position information in the user information table 210. In this case, the current position is the starting point.

Now the procedure for positioning the user will be described. In this navigation system, the GPS server 205 is always sending positioning-support information to the mobile terminal 202 through the communication network 203 and the radio base station 204. The positioning-support information is information about GPS satellites (including the one 206) whose GPS signals the mobile terminal 202 can receive. According to the positioning-support information, the mobile terminal 202 receives signals from GPS satellites including the one 206 and transmits the GPS signals to the GPS server 205 through the radio base station 204 and the communication network (the Internet) 203. The GPS server 205 calculates the latitude and longitude of the current position of the mobile terminal 202 based on the GPS signals and provides the calculated latitude and longitude to the mobile terminal 202. The latitude and longitude of the current position are stored in the storage 104 of the mobile terminal 202 and are sent to the navigation server 208 on demand.

After storing all the necessary information in the user information table 210, the navigation server 208 acquires map information covering the current position, destination, and relay points from the map database 212 and derives information about the shortest route from the route database 213 based on the current-position information, destination information, and relay-point information. Then, the navigation server 208 sends the map information containing the current position, the destination and the relay point, and the shortest route information to the mobile terminal 202. The mobile terminal 202 stores the map information and the route information in the storage 104. The display 103 of the mobile terminal 202 displays the stored map information and the route information, and the user can follow the shortest route to the destination, consulting the map information and the route information.

The mobile terminal 202 calculates the time "t" necessary for the user to walk from the current position to the next relay point or destination, as the case may be, based on the current-position information, the relay-point or destination information (as the case may be), and the user's walking speed and stores the calculated time "t" in the storage 104. After sending the map information and the route information to the mobile terminal 202 as described above, the navigation server 208 terminates its communication with the mobile terminal 202 for the time being.

After the time "t−Δt" passes (Δt being a preset time), the navigation server 208 acquires information about the current position of the mobile terminal 202 based on the portable-telephone ID by using the current-position detector 101 and stores the current-position information in the user information table 210. By using the distance calculator 214, the navigation controller 209 calculates the distance "r" from the current position to the next relay point or destination, as the case may be, based on the current-position information and the relay-point or destination information, as the case may be, in the user information table 210 and compares the calculated distance "r" with a preset threshold value "R". If the calculated distance "r" is larger than the threshold value "R" and hence the user is still far away from the next relay point or destination, the navigation server 208 terminates its communication with the mobile terminal 202 without causing the display 103, to display a map. Instead, the display 103 may display a whole map covering the current position, relay points, and destination for a preset time and then let it go off. If the user strays from the given shortest route, the guidance may be redone or map information covering the user's neighborhood and information about the user's current position may be displayed on the display 103.

If the calculated distance "r" is equal to or smaller than the threshold value "R" and hence the user has come close to the next relay point or destination, as the case may be, detailed map information of the neighborhood of the next relay point or destination, as the case may be, and detailed information about the route which the user is following are derived from the map database 212 and the route database 213, sent to the mobile terminal 202, and displayed on the display 103. The distance "r" is calculated successively. As the user heads further for the next relay point or destination, as the case may be, after passing a relay-point, the distance "r" from the last relay point to the current point increases. When the distance "r" becomes larger than the threshold value "R", the navigation server 208 terminates its communication with the mobile terminal 202 as well as the distance calculation and the display of the map goes off.

The above steps are repeated until the user arrives at the destination or quits receiving guidance service from the navigation system.

With reference to FIGS. 4 and 6–10, the workings of the navigation system of the invention will be further described. When a user 310, wanting to go to a destination 303 under the guidance by the navigation system, is at a starting point 301, the user has access to the navigation server 208 through the mobile terminal 202 and inputs a relay point 302 and the destination 303 into the navigation server 208. When the above information have been inputted, the navigation server 208 acquires information about the user's current, or starting, point from the mobile terminal 202 and sends map information covering the starting point 301, relay point 302, and destination 303 and information about the shortest route to the mobile terminal 202, which stores the map information and the route information in the storage 104 of the mobile terminal 202 and displays them on the display 103. The display may go off after a preset time passes.

Figure 4:
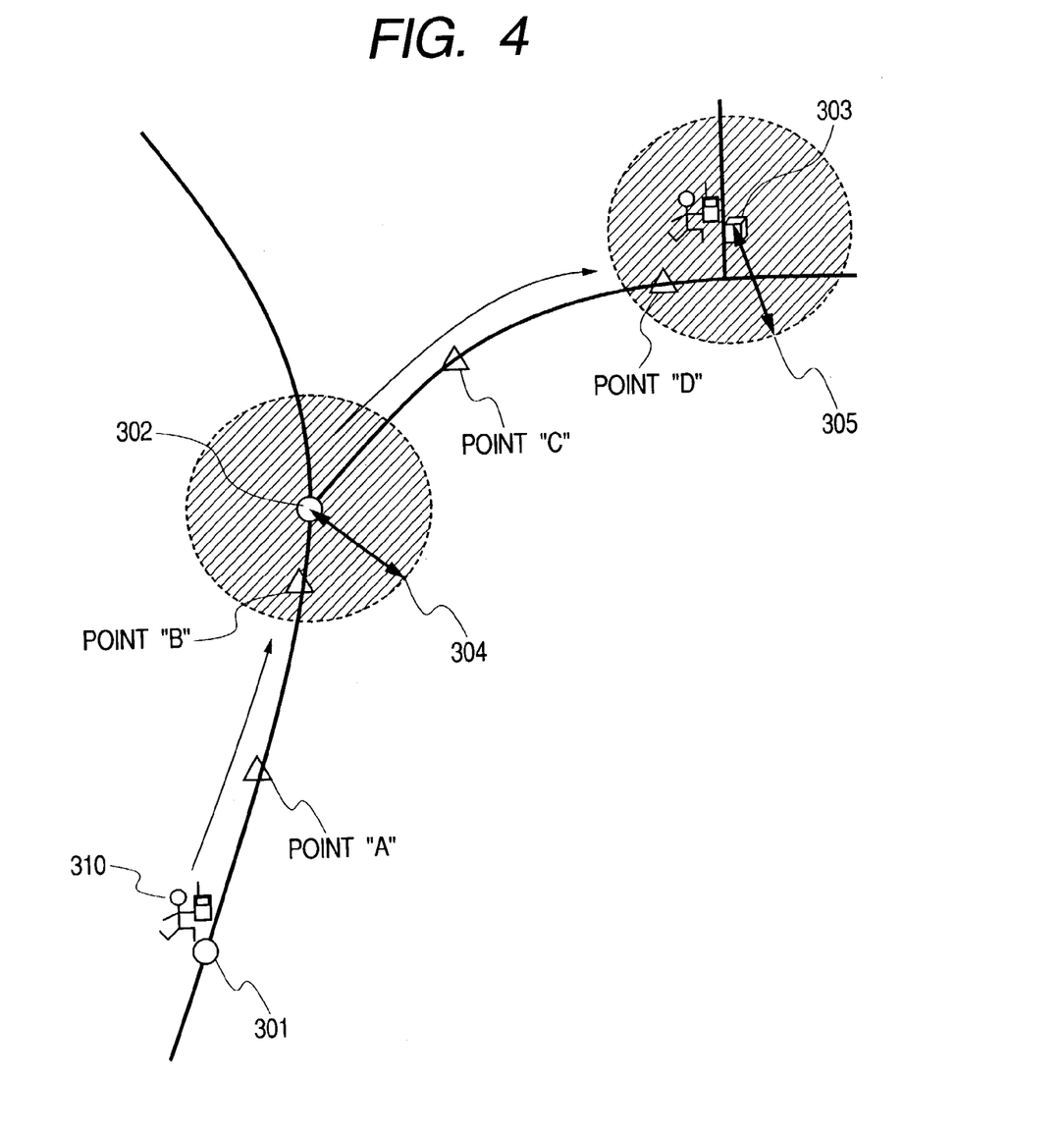
FIG. 4 illustrates an embodiment using the navigation system with the mobile terminal of FIG. 1.

The user can follow the shortest route to the relay point 302 and the destination 303, consulting the map information and the route information on the display 103. Also, after sending the map information and the route information to the mobile terminal 202 as described above, the navigation server 208 terminates its communication with the mobile terminal 202 for the time being.

Consulting the map information, the user 310 heads for the relay point 302. Then, the user 310 further heads for the destination 303 and, after the calculated necessary time t from the starting point 301 to the relay point 302 minus a preset time Δt, the user 310 reaches a point "A". The navigation server 208 automatically connects itself with the mobile terminal 202 of the user 310, acquires information about the current position (point "A") of the user 310, calculates the distance "r" from the point "A" to the destination 303 as well as from the point "A" to the relay point 302, and compares "r" with a preset threshold value "R". If "r" is larger than "R", the navigation server 208 judges the user 310 to be still far from the destination 303 and the relay point 302, and the display 103 is put in the non-display mode.

Figure 7:
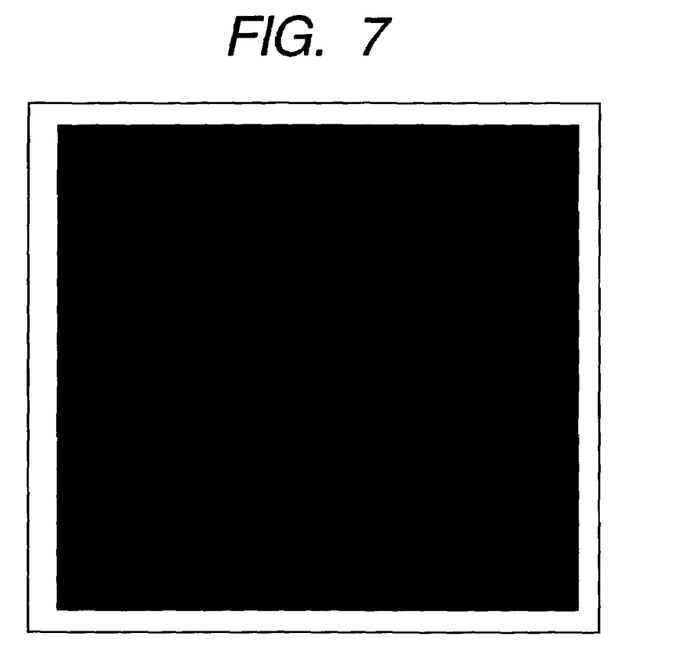
FIG. 7 is another example of pictures on the display 103 of the mobile terminal of FIG. 2 (Displayed Example 2)

FIG. 7 is an example of pictures on the display 103. "Non-display" of map information means that the display 103 displays nothing, the electric current through the liquid crystal display, etc. of the display 103 being off. However, while in the non-display mode, the display 103 may display the current time, wallpaper, or a screen saver. Amount of power to be saved in this case will be described in particular. A portable telephone, for example, consumes 380 mA on an average while it is engaged in continuous communication, or full-time guidance (communication plus display), its battery lasting for only 1.63 hours or so. On the other hand, according to the present invention, the portable telephone consumes 4.0 mA/h on an average while it is in a waiting mode (no communication and non-display). Thus, the battery life is elongated by 90 times at the maximum.

While the user 310 is heading further for the relay point 302, calculated at a point is the time t' necessary for the user 310 to walk from the point to the relay point 302. After the lapse of the calculated necessary time t' minus a preset time Δt, the user reaches a point "B". The navigation server 208 automatically connects itself with the mobile terminal 202 of the user 310, acquires information about the current position (point "B") of the user 310, calculates the distances r's from the current position (point "B") to the relay point 302 and the destination 303, and compare r's with the threshold value R. According to the comparison, the navigation server 208 judges the user 310 to be still far from the destination 303 but near the relay point 302 and sends detailed map information and detailed route information of the neighborhood of the relay point 302 to the mobile terminal 202. The mobile terminal 202 stores the map and route information in its storage 104 and displays the map and route information on its display 103. Thereafter, when the distance r from the relay point 302 or the destination 303 to the user's current position becomes larger than the threshold value R, the display 103 is put in the non-display mode.

Figure 8:
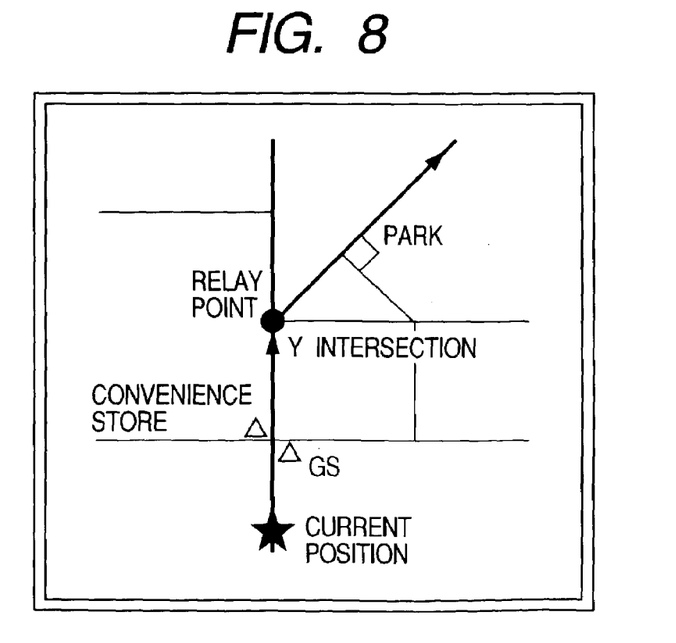
FIG. 8 is yet another example of pictures on the display 103 of the mobile terminal of FIG. 2 (Displayed Example 3)

FIG. 8 is an example of pictures on the display 103. The controller 105 of the mobile terminal 202 controls the display 103 to display a detailed map of the neighborhood of the relay point 302 specified by the user, which includes many pieces of information such as names of intersections, shops, etc. in the neighborhood of the relay point 302 and along the route which the user 310 is following. Thus, the user 310 can reach and pass the relay point 302 without getting lost. When the distance r from the relay point 302 to the user's current position becomes larger than the threshold value R, the navigation server 208 terminates its communication with the mobile terminal 202 for the time being.

While the user 310 is heading further for the destination 303, calculated at a point is the time t" necessary for the user 310 to walk from the point to the destination 303. After the lapse of the calculated necessary time t" minus Δt, the user 310 reaches a point "D". In the same way as described above, the distance r from the point "D" to the destination 303 is compared with the threshold value R.

Figure 10:
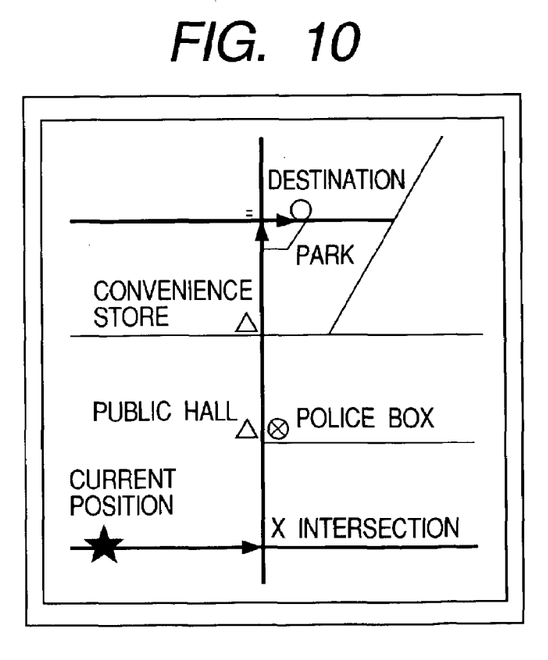
FIG. 10 is yet another example of pictures on the display 103 of the mobile terminal of FIG. 2 (Displayed Example 5).

FIG. 10 is an example of pictures on the display 103. The controller 105 of the mobile terminal 202 controls the display 103 to display a detailed map of, and detailed information about the route in, the neighborhood of the destination 303 specified by the user, which includes many pieces of information such as names of intersections, shops, etc. in the neighborhood of the destination and along the route which the user 310 is following. Thus, the user 310 can arrive at the destination 303 without getting lost. The navigation server 208 terminates its communication with the mobile terminal 202 after the former sends the detailed map information and the detailed route information to the latter.

While the user 310 is heading for the destination 303, calculated at a point is the time t" necessary for the user 310 to walk from the point to the destination 303. After the lapse of the calculated necessary time t" minus Δt, the user reaches a point "C". The navigation server 208 automatically connects itself with the mobile terminal 202 of the user 310, acquires information about the user's current position (point "C"), calculates the distance r from the relay point 302 to the point "C" and the distance r from the point "C" to the destination 303, and compares the distances r's with the threshold value R to judge that the user 310 is far from both the relay point 302 and the destination 303, and the display 103 is put in the non-display mode. Instead of putting the display 103 in the non-display mode, the navigation server 208 may provide the mobile terminal 202 with rough map information covering the current position and the destination 303 and information about the shortest route from the current position to the destination 303, and the mobile terminal 202 may store the map and route information in the storage 104 of the mobile terminal 202 and display the provided map and route information on the display 103 for a preset time before putting the display 103 in the non-display mode. If the user is off the route, the guidance may be redone or the mobile terminal 202 may acquire latitude/longitude information about the current position from the GPS server 205 or map information of the neighborhood of the current position from the navigation server 208 to display the map information on the display 103.

Figure 9:
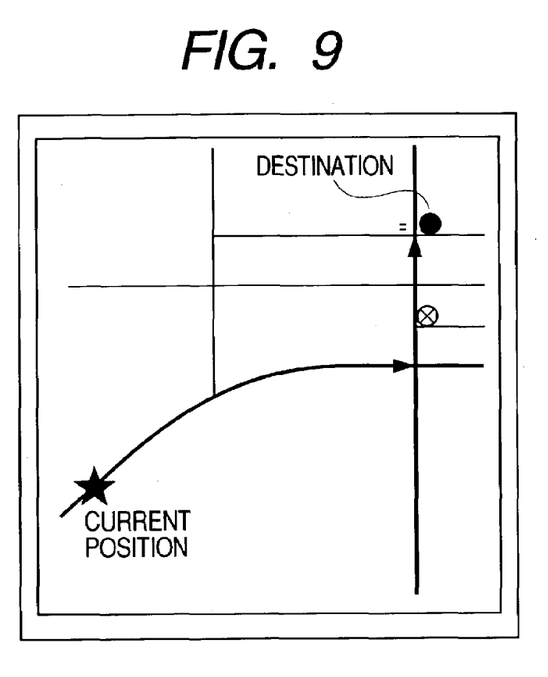
FIG. 9 is yet another example of pictures on the display 103 of the mobile terminal of FIG. 2 (Displayed Example 4)

FIG. 9 is an example of pictures on the display 103. The map information of FIG. 9 is rough and showing the shortest route information so that the display 103 can display a wide area covering the current position and the destination 303, but the map information is more detailed and easier to consult than the map information at the starting point 301. Consulting the renewed map information and the route information, the user 310 can head further for the destination 303. The navigation server 208 terminates its communication with the mobile terminal 202 for the time being after sending the map information and the route information to the mobile terminal 202.

Figure 5:
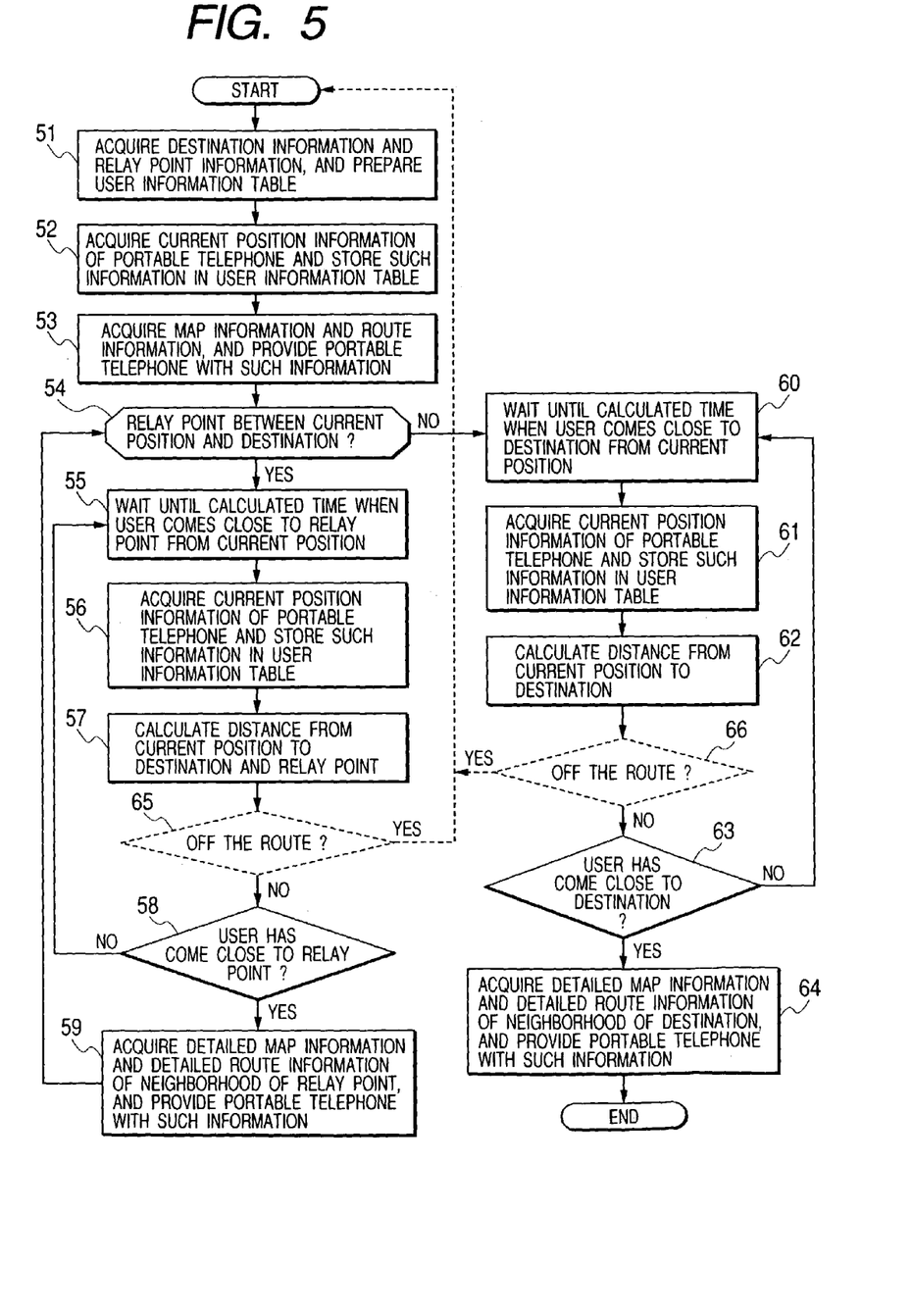
FIG. 5 is a flowchart of the workings of the navigation system with the mobile terminal of FIG. 1 (Embodiment 1)
Figure 6:
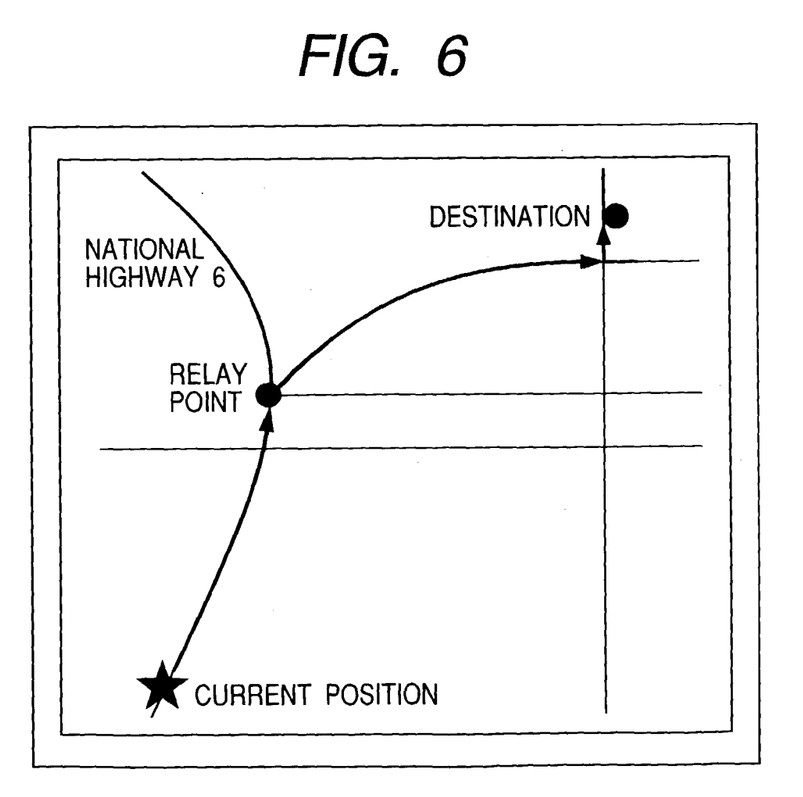
FIG. 6 is an example of pictures on the display 103 of the mobile terminal of FIG. 2 (Displayed Example 1)

With reference to FIG. 5, the process of workings of the navigation server 208 will now be described.

FIG. 5 is a flowchart of the workings of the navigation server 208 of a first embodiment according to the present invention. The process starts when the user 310 has access to the navigation server 208 through the mobile terminal 202. In Step 51, the navigation server 208 acquires, from the destination database 211, information about the destination and the relay points, if any, inputted from the mobile terminal 202 by the user 310 and prepares a user information table 210 including the user's portable-telephone ID. In Step 52, the navigation server 208 acquires information about the user's current position or starting point from the mobile terminal 202 and stores the information in the user information table 210. In Step 53, the navigation server 208 acquires map information and information about the shortest route from the map and route databases 212 and 213 based on the information about the destination, relay points (if any), and current position in the user information table 210, sends the map and route information to the mobile terminal 202, and terminates its communication with the mobile terminal 202. The mobile terminal 202 displays the map information and the route information on the display 103 and the user 310 can head for the first relay point or destination, as the case may be consulting the map information and the route information. The display 103 is put in the non-display mode after the lapse of a preset time.

In Step 54, the navigation server 208 checks the user information table 210 for relay points between the user's current position and the destination. If there are relay points between the user's current position and the destination, the navigation server 208 goes to Step 55. The navigation server 208 calculates the time t necessary for the user 310 to walk from the current position to the first relay point. In Step 56, after the lapse of the time t minus the preset time Δt, the navigation server 208 acquires information about the user's current position from the mobile terminal 202 and stores the information in the user information table 210. In Step 57, the navigation server 208 has the distance calculator 214 calculate the distances from the user's current position to the first relay point and the destination based on the information about the current position, the first relay point, and the destination in the user information table 210. In Step 58, the navigation server 208 compares the distance r from the user's current position to the first relay point with the preset threshold value R. If the navigation server 208 judges that the user 310 has come close to the first relay point (r≦R), the navigation server 208 goes to Step 59. The navigation server 208 acquires detailed map information and route information of the neighborhood of the first relay point from the map and route databases 212 and 213, sends the detailed map and route information to the mobile terminal 202, and terminates its communication with the mobile terminal 202. Also, if the navigation server 208 judges that the user is far from the relay point (r>R), it waits until the calculated time when the user comes close to the relay point again. Further, when the current position is not on the route, a map of the neighborhood of the current position may be displayed. Also, in this regard, the map database 212 and the route database 213 may provide the map information and the route information of the neighborhood of the current position to redo the route guidance.

Then, the navigation server 208 returns to Step 54 and, when there are no relay points between the current position and the destination, it goes to Step 60 and waits until the calculated time t' necessary to reach the destination minus the preset time Δt (t'-Δt) has passed. When the navigation server 208 judges in Step 63 that the user has not come close to the destination, it goes to Step 60. Further, when the current position is not on the route, a map of the neighborhood of the current position may be displayed. Also, in this regard, the map database 212 and the route database 213 may provide the map information and the route information of the neighborhood of the current position to redo the route guidance.

In Step 63, the navigation server 208 compares the distance from the current position to the destination with a preset threshold value "R". When the navigation server judges that the user has come close to the destination (r≦R), in Step 64, it acquires detailed map information and the route information of the neighborhood of the destination from the map database 212 and the route database 213, respectively. After providing the detailed map information and the detailed route information to the mobile terminal 202, the navigation server 208 terminates its communication with the mobile terminal 202. Since detailed map information and route information of the neighborhood of the destination are shown on the display 103 of the mobile terminal 202, the user can reach the destination without getting lost. Also, when the navigation server 208 judges that the user is far from the destination (r>R), it waits until the calculated time for the user to come close to the destination again. Further, when the current position is not found on the route, map of the neighborhood of the current position may be displayed. Also, in this regard, the map database 212 and the route database 213 may provide the map information and the route information of the neighborhood of the current position to redo the route guidance.

Now, an alternative example of the present embodiment to achieve further power saving will be described.

When the current position is acquired and the destination and the relay point are inputted, all the map information necessary for route guidance may be provided to the mobile terminal 202 as a single unit from the navigation server 208. In this regard, all the provided map information necessary for the route guidance may be stored in the storage 104 of the mobile terminal 202, and the map information may be read from the storage 104 as required.

In the present embodiment, an on/off operation of the user interface has not been referred to. However, the user interface may be turned on and off depending on the distance from the current position to the destination or the distance from the current position to the relay point, or depending on the calculated time necessary for the user to reach the destination or the relay point. Thus, further power saving can be achieved.

In the present embodiment, the whole map shown on the way is, as in FIG. 9, somewhat scaled down compared to the original whole map and sequentially updated to each map from the current position to the destination. However, it is possible that the starting point is stored, and a whole map covering the starting point to the destination in which the current position alone is updated is provided as a map on the way. This is for further achieving power saving.

It is also possible that the map information is provided as a single unit with the position information such as the latitude and longitude. Then, the user's current position is acquired only when starting navigation and, afterwards, without using a communication interface, the current position information such as the latitude and longitude may be calculated by the navigation server or by the mobile terminal. By comparing the latitude and longitude of the map itself and the latitude and longitude of the user's current position, the user's current position can be shown on the map. Further, the frequency in use of the communication interface is reduced, thereby saving power.

In the present embodiment, when the user has come close to a relay point or the destination, namely, when the distance "r" from the user's current position to the relay point or to the destination is equal to or smaller than the threshold value "R" ($r \leq R$), the server sequentially connects itself with the mobile terminal. However, the connection may be turned on and off at preset intervals, thereby further saving power.

Although an on/off operation of backlighting is not referred to in the present embodiment, the on/off operation of the backlighting may be controlled. For example, when further saving power, a power saving mode in which the backlighting is turned off during the route guidance may be provided.

In the present embodiment, the route guidance is achieved by providing map information when the user comes close to the current position, the relay point, and so on. However, the map information and then the route guidance may be provided only when the user is off the route, namely, when the user gets lost. Since the map doesn't have to be shown when the user is not lost, further power saving can be achieved. Also, according to the user's needs, maps to be shown such as those of the current position and the destination may be determined, thereby saving power and enhancing the usability of the system.

In the present embodiment, when the user has come close to a relay point or the destination, namely, when the distance "r" from the user's current position to the relay point or to the destination is equal to or smaller than the threshold value "R" ($r \leq R$), the map information and the route information are shown on the display. In such a case ($r \leq R$), the current position information may always be displayed, or may be displayed at preset intervals, which is for enhancing the usability of the system and saving power.

Now, an alternative art for implementing the present invention will be described.

In the present embodiment, a system using the GPS server 205 has been described. However, a system which does not use the GPS server 205 may be employed. The present invention can be implemented without the GPS server 205 so long as the mobile terminal 202 is the one which can independently acquire the current position information by returning signals of a plurality of GPS satellites to former states.

The present embodiment is a GPS navigation system using GPS satellites and a GPS signal receiver. However, the present invention can be implemented even if the navigation system does not use GPS satellites.

As shown by the dotted line in FIG. 2, the GPS signal receiver may be included in the current position detector.

In the present embodiment, the navigation server 208 comprises the user information table 210, the navigation controller 209, and the distance calculator 214. However, they may be provided on the side of the mobile terminal 202.

According to the present invention, the current position information is acquired by the GPS receiver. However, the method of acquiring the current position information is not limited to this, and other methods may be employed.

In the present embodiment, the distance "r" from the user's current position to the destination or the relay point, and the preset distance "R" are compared, thereby turning on and off the display depending on ($r \leq R$) and ($r > R$). However, it is needless to say that the display may be turned on and off depending on ($r < R$) and ($r \geq R$). Further, the same holds true when the display is turned on and of f depending on time.

Now, an alternative example to further enhance the usability will be described.

The displayed example in the present embodiment is one embodiment, and the contents to be displayed are not limited to this. For example, when displaying detailed map information and route information, character information and illustration information, etc. may be displayed at the same time for enhancing usability.

The preset time $\Delta t$ to be deducted from the calculated time to reach the destination or the relay point may vary depending on the relay point or the destination (for example, $\Delta t'$, $\Delta t''$ and so on). Also, such time may be calculated by the navigation server and sent to the mobile terminal for enhancing usability.

In the present embodiment, the user compares the distance "r" from the user's current position to the relay point or the destination with the preset threshold value "R" to turn on and off the display. However, the calculated time necessary to reach the relay point or the destination from the current position and the preset time may be compared to turn on and off the display. For example, there may be a case in which time rather than distance should be used for judgement such as in route guidance of short distance in the city streets, etc.

In the present embodiment, when providing route guidance, a whole map is displayed for a preset time period at the starting point. However, it is also possible that detailed map information and route information of the starting point are provided by the navigation server 208 and, further, the distance "r" from the starting point to the user's current position and a preset distance "R" are compared to turn off the display when the distance "r" from the starting point to the user's current position is larger than the preset distance (r>R).

In the present embodiment, when the server automatically determines routing, the shortest route is chosen. However, it may not be the shortest one. Cases in which it is safer to use a footbridge or safer to use a well-trafficked route, and cases in a tourist resort, etc. may be taken into account.

When providing the mobile terminal 202 with the map information and the route information in Steps. 53, 59 and 64, it is also possible that information for sending a notice by sound and/or a notice by vibration are at the same time provided. At the mobile terminal 202, in addition to displaying maps and routes, the notice by sound and/or the notice by vibration may be given. Accordingly, time when the map information is updated is known and the user doesn't have to always watch the display, which enhances usability.

The preset time period for displaying a map may be determined in advance by the user. Accordingly, the user can make a decision whether to show a map on the display 103 for a long time to reach the destination without getting lost or to reach the destination while saving power as much as possible, thereby enhancing usability.

In Steps 58 and 63, in the case of "no," the current position information, map information and route information may be acquired again to be provided to the mobile terminal 202. Accordingly, route guidance with higher precision can be provided, enhancing usability.

It is needless to say that the input method of a "destination" and a "relay point" is not limited to the method of the present embodiment. For example, it is possible that a map is shown on the display 103 of the mobile terminal 202 by inputting the current position only, the map being shown on the display 103 using a touch panel in which designation is made by user's touch pen, etc. Further, the "relay point" may be inputted such that candidate points are displayed according to information from the navigation server 208 and a choice is made by the user. Accordingly, not only route guidance of the shortest route but also route guidance for sightseeing, etc. can be provided.

When a map is not displayed, the map may be shown by pressing a button, using a touch pen, and so on. Also, a current position may be acquired at that time. Accordingly, the user can reach the destination without getting lost, which improves precision of route guidance and thereby, enhancing further usability.

The user may not input the "relay point" and, instead, the navigation server 208 may select and set it automatically. Further, in consideration of pedestrians, etc., the usability is enhanced when the navigation server 208 automatically selects and sets relay points such as an intersection, a spot in front of a footbridge, an entrance of a building and an underground passageway entrance. Such a method can also reduce complicated operations.

In the present embodiment, a whole map and detailed maps of the neighborhood of the relay point and the destination only are used for route guidance. However, a detailed map of the current position may be used. Also, three of the detailed map of the current position, a detailed map of the next relay point (the destination when there is no relay point) and the whole map may be used at the same time for route guidance. This way, precision of the route guidance is further improved. Also, in this regard, maps may be switched by pressing buttons, using a touch pen, and so on.

As has been described, according to the present invention, route guidance in which battery drain is cut by turning on and off the display of maps depending on the distance from the current position to the destination.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and range of equivalency of the claims are therefore intended to be embraced therein.

What is claimed is:

1. A navigation system comprising:
   a mobile terminal including a position detector to acquire position information of a current position of the mobile terminal, an input interface for receiving position information of a desired destination, and a display for displaying the map information;
   a navigation server connected to the mobile terminal through a communication network, the navigation server including an information database for storing the map information and a map information provider which reads map information from the information database according to the position information, the map information including a route calculated according to the current position, the destination, a relay point; and
   a controller coupled to the server and the display to turn on and off the display of map information based upon distance between at least one of the current position and the destination, and the current position and the relay point
   wherein the controller controls the storage and the display so as to display at least a portion of the map information when a distance "r" from one of the current position to the destination or the current position to the relay point is no greater than a preset distance "R", and not to display the map information when the distance "r" is larger than the preset distance "R", and wherein the controller controls the position detector to acquire position information of the current position after a lapse of a calculated time "t" to reach the destination or the relay point from the current position less a preset time "Δt", to compare after the lapse the distance "r" from one of the current position to the destination or the current position to the relay point with the preset distance "R."

2. A navigation system according to claim 1, wherein said controller controls said display and said storage so as to display said map information and position information of said current position of said mobile terminal when said current position of said mobile terminal is off the route contained in said map information.

3. A navigation system according to claim 1, wherein said map information provider provides the mobile terminal with map information used for route guidance as a single unit, and said storage stores said map information used for route guidance provided as a single unit.

4. A navigation system according to claim 1, wherein said controller controls said display and said storage so as to selectively display all the map information or a portion of the map information used for route guidance.

5. A mobile terminal which retrieves map information through a communication network, to which map information used for route guidance is provided by a navigation server, and displays such information, comprising:
- a position detector acquiring position information of a current position of the mobile terminal;
- an input interface for receiving position information of a destination and a relay point;
- a storage for storing the map information provided by the navigation server;
- a display for displaying the map information;
- a controller coupled to the storage and the display for controlling them;
- wherein the controller controls the display and the storage to turn on and off the display of the map information depending on a calculated time for reaching the destination from the current position; and
- wherein the controller controls the position detector to acquire position information of the current position of the mobile terminal after a lapse of a calculated time "t" to reach one of the destination or the relay point from the current position minus a preset time "Δt" to compare after the lapse a distance "r" from one of the current position to the destination or the current position to the relay point, with a preset distance "R," and to display map information when "r" is no greater than the preset distance "R", and not to display the map information used for route guidance when "r" is larger then "R."

6. A mobile terminal according to claim 5, wherein said controller controls said display and said storage so as to display said map information and position information of said current position of said mobile terminal when said current position of said mobile terminal is off said route.

7. A mobile terminal according to claim 5, wherein said controller controls said display and said storage so as to display said map information and position information of said current position of said mobile terminal when said current position of said mobile terminal is off said route.

8. A mobile terminal according to claim 5, wherein said controller controls said display and said storage so as to selectively display all the map information or a portion of the map information.

9. A mobile terminal according to claim 5, wherein said controller controls said display and said storage so as to selectively display all the map information or a portion of the map information.

10. A mobile terminal according to claim 5 wherein the controller controls the position detector to acquire position information of the current position after a lapse of a calculated time "t" to reach the destination or the relay point from the current position of the mobile terminal minus a first preset time "Δt" to compare a second preset time "T" with the calculated time "t", to display map information used for route guidance when the calculated time "t" is not greater than the second preset time "T", and not to display the map information used for route guidance when the calculated time "t" is larger than said second preset time "T."

* * * * *